(12) United States Patent
Avery, III

(10) Patent No.: US 9,145,697 B1
(45) Date of Patent: Sep. 29, 2015

(54) RESTROOM PARTITION MOUNTING BRACKET

(71) Applicant: John Leonard Avery, III, Colfax, NC (US)

(72) Inventor: John Leonard Avery, III, Colfax, NC (US)

(73) Assignee: AVERY AEROSPACE CORPORATION, Jupiter, FL (US)

( * ) Notice: Subject to any disclaimer, the term of this patent is extended or adjusted under 35 U.S.C. 154(b) by 0 days.

(21) Appl. No.: 14/604,532

(22) Filed: Jan. 23, 2015

(51) Int. Cl.
| | | |
|---|---|---|
| E04H 1/12 | (2006.01) | |
| A47B 96/06 | (2006.01) | |
| F16M 13/02 | (2006.01) | |
| E04B 2/82 | (2006.01) | |

(52) U.S. Cl.
CPC .............. *E04H 1/1266* (2013.01); *A47B 96/06* (2013.01); *E04B 2/828* (2013.01); *F16M 13/02* (2013.01)

(58) Field of Classification Search
CPC ... E04H 1/1266; E04B 2/7401; E04B 2/7425; E04B 2/82; E04B 2/828; A47B 96/04; A47B 96/06; A47K 2201/02
See application file for complete search history.

(56) References Cited

U.S. PATENT DOCUMENTS

| | | | |
|---|---|---|---|
| 1,221,205 A | | 4/1917 | Moore |
| 1,259,358 A | | 3/1918 | Carpenter |
| 1,311,229 A | | 7/1919 | Hughes |
| 1,560,128 A | * | 11/1925 | Youngblood .................. 182/48 |
| 2,175,717 A | * | 10/1939 | Kerr .................................. 52/65 |
| 2,287,079 A | * | 6/1942 | Anderson ........................ 52/239 |
| 2,709,494 A | * | 5/1955 | Luce ............................. 180/68.5 |
| 2,776,029 A | | 1/1957 | Hult |
| 3,348,346 A | * | 10/1967 | Heim et al. ...................... 52/239 |
| 3,370,388 A | * | 2/1968 | Dielman ........................ 52/239 |
| 4,450,635 A | * | 5/1984 | Shwayder ....................... 37/271 |
| 4,616,950 A | * | 10/1986 | Morris ......................... 403/231 |
| 4,949,929 A | * | 8/1990 | Kesselman et al. ........... 248/300 |
| 5,050,832 A | * | 9/1991 | Lee et al. .................. 248/225.11 |
| 5,632,567 A | * | 5/1997 | Lowe et al. ....................... 403/3 |
| 5,881,517 A | * | 3/1999 | Prince et al. .................. 52/238.1 |
| 5,937,605 A | * | 8/1999 | Wendt ....................... 52/506.06 |
| 5,964,438 A | * | 10/1999 | Camilleri ................. 248/225.21 |
| 6,065,724 A | * | 5/2000 | Arslan et al. ................... 248/248 |
| 6,430,779 B1 | * | 8/2002 | Goldsmith et al. ............. 16/382 |
| 7,716,886 B2 | * | 5/2010 | Gordon ............................ 52/213 |
| 7,841,654 B1 | * | 11/2010 | Cardana ....................... 297/195.1 |
| 2007/0144088 A1 | * | 6/2007 | Kuenzel ....................... 52/238.1 |

OTHER PUBLICATIONS

Page 367 of the 2013 Equiparts catalog found online at www.equiparts.net.*

* cited by examiner

*Primary Examiner* — Robert Canfield

(57) ABSTRACT

A restroom partition mounting bracket that allows vertical load to be transferred to a wall or other surface without creating tension loads on the wall fasteners from prying, thus eliminating the most common failure mode of typical restroom partition installations. The bracket will accept attachments to the wall and partition using hole locations from a previously installed, typical, bracket of varying dimension. The two-eared U-bracket has a plurality of slots that accepts fasteners at locations of existing holes. An additional connection is added to the partition to mitigate bracket rotation due to load eccentricity. The mounting bracket is used to replace previously installed, typical, attachment brackets, or it may be used to secure a partition in a new installation.

1 Claim, 4 Drawing Sheets

RESTROOM PARTITION MOUNTING BRACKET

CROSS-REFERENCE TO RELATED APPLICATIONS

This application claims the benefit of PPA Ser. No. 61/984,837, filed 2014 Apr. 27 by the present inventor.

FEDERALLY SPONSORED RESEARCH

Not Applicable

SEQUENCE LISTING OR PROGRAM

Not Applicable

BACKGROUND OF THE INVENTION

1. Field of Invention

The present invention relates generally to mounting brackets and, more particularly, to restroom hardware mounting brackets of the type that may be fastened to a wall or other surface to support dividers, partitions, or panels in public restrooms.

2. Prior Art

Privacy enclosures for use in restrooms are well known in the art. Public bathroom privacy panels have been in existence since 1917. See U.S. Pat. No. 1,311,229 (Hughes) U.S. Pat. No. 1,221,205 (Moore), and U.S. Pat. No. 1,259,358 (Carpenter). The modern restroom partition system was developed in about 1957 by Hult. See U.S. Pat. No. 2,776,029 (Hult). This system utilized metal panels that attached to the walls using specialized brackets. Most partition systems today are based this design and use similar brackets.

Partitions are commonly fastened to the wall by U-shaped mounting brackets containing a single or double flange, commonly referred to as ears, extending from the bottom of the U, outwardly, in one or both directions. Each flange has a center hole that provides a means to screw, bolt, or otherwise fasten the bracket to the wall. The two flanges making up the U-shape, each, commonly contain a single hole to provide means to screw, bolt, or otherwise fasten the bracket to the partition or divider.

Typical installations of restroom privacy stalls enclose each toilet using partitions or dividers, a door and pilasters. Each partition or divider is commonly attached to the wall using the U-shape brackets with ears. The other side of the partition is commonly attached to a pilaster using different style brackets. Loads from the partition's weight or from abuse are distributed to each bracket on both ends of the partition. The magnitude of the vertical load on the brackets attaching the partition to the wall will vary, depending on whether the pilaster is laterally constrained to the floor or ceiling. In a perfectly idealized installation, using the typical or common wall attachment brackets, the pilaster carries all weight and vertical abuse loads to the floor. The partition, in essence, is leaned against the wall and the wall brackets act as links, carrying little vertical load. However, common brackets regularly have failed wall connections because of loose pilaster attachments to the floor or ceiling. The vertical load applied from the partition causes prying loads that exceed the wall fastener's installed tension strength. Failure generally causes the fasteners or anchors to pull out of the wall, allowing the bracket to rotate. It is very common for brackets to be unsecured from the wall and rotated in a position no longer perpendicular to the wall, as originally installed.

Applicant's assignee manufactures replacement restroom partition mounting brackets from extruded aluminum that allows vertical load to be transferred to the wall without creating tension loads on the wall fasteners from prying, thus eliminating the most common failure mode of typical restroom partition installations.

SUMMARY OF INVENTION

The present invention provides an attachment to a wall or other surface for restroom partitions that alleviates wall fastener tension from prying and, thereby, substantially increasing vertical load capability. Further, the mounting arrangement allows for the direct replacement of a variety of typical or common brackets, using the original hole locations in both the wall and partition. Only hole cleanup and/or enlargement is required, along with one addition hole drilled in the partition concentric to guide holes provided in the present invention. If the present invention is used to replace a common or typical bracket that contains only one base flange, or ear, an addition screw, bolt or other means of attachment is used to pick up the base slot that was omitted in the original bracket. Alternately, the present invention may be used to mount partitions to the wall in new installations.

These and other features and advantages of the present invention will be readily apparent to those of skill in the art from a review of the following detailed description along with the accompanying drawing figures.

DETAILED DESCRIPTION OF THE PREFERRED EMBODIMENTS

Figure 1:
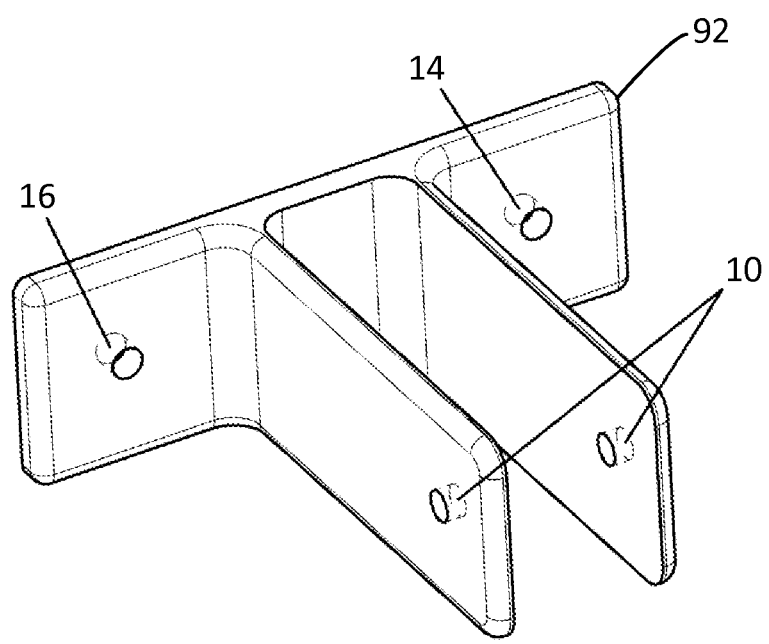
FIG. 1 is a perspective view of the prior art bracket for mounting a privacy partition to the wall of a restroom.
Figure 2:
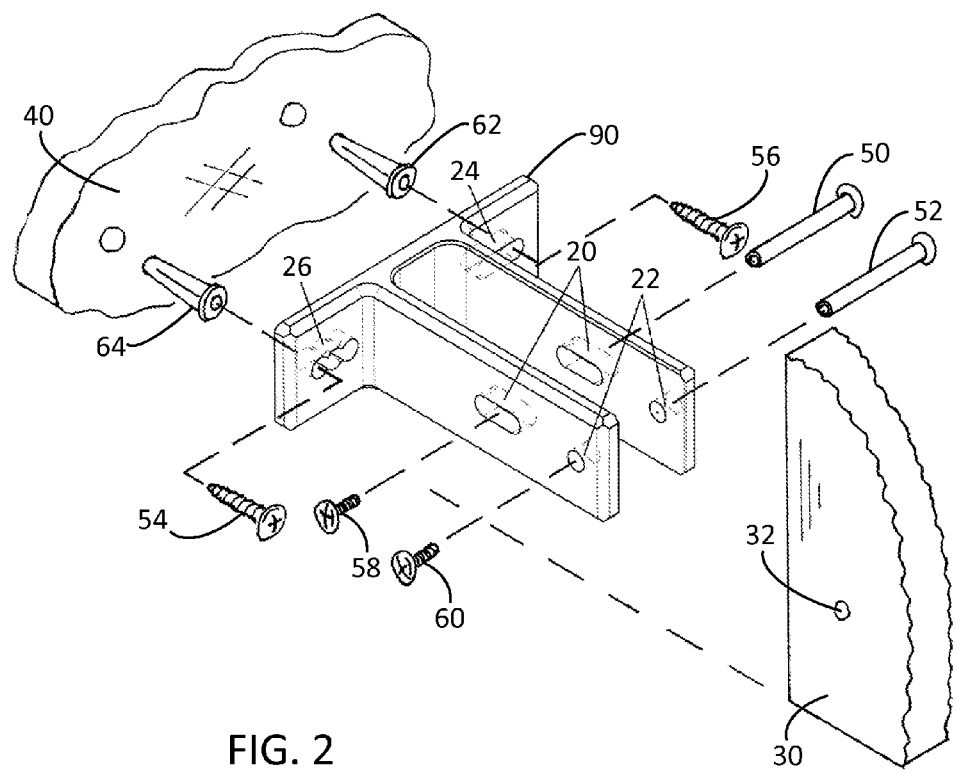
FIG. 2 is an exploded perspective view of the present invention to receive and support a partition.

So that the objects and advantages of the present invention may be understood more fully, reference is first made to FIGS. 1 and 2. FIG. 1 depicts a typical two-eared toilet partition wall attachment bracket. Each flange contains a hole used to screw, fastener or otherwise secure the bracket 92 to a wall and to attach a partition. Holes 14 and 16 are used to locate and secure the base of the bracket 92 to the wall. Holes 10 in the other flanges are used to locate and screw, fasten or otherwise secure the partition to the bracket 92.

The partition is attached to the typical bracket 92 using one or two fasteners with axis aligned with the center of holes 10. This single-axis attachment acts as a hinge between the partition and bracket 92. Vertical load applied to the bracket 92 from the partition and opposite direction load to the base of the bracket 92 from the wall, create an eccentricity that is balanced by prying between wall fasteners located at holes 14 and 16 and the base's edge of the bracket 92 against the wall. Tension load is developed in the wall fasteners, at hole locations 14 and 16. These fasteners pull loose from the wall if loads exceed the tension strength of the installed fasteners.

The present invention, depicted in FIG. 2, provides a rigid attachment to the partition 30 using two fastener assemblies 50/58 and 52/60 at slots 20 and holes 22. There is a vertical load eccentricity between that applied by the partition 30 to that reacted from the wall 40. The attachments at slots 20 and holes 22 of the bracket 90 provide a means to balance the load eccentricity of the bracket within the partition 30, thereby, eliminating tension loads on fasteners 54 and 56 and anchors 62 and 64 caused from prying. Shims in the form of washers or otherwise (not shown) may be used between the partition 30 and the pair of protruding flanges that make up the U-shaped part of the bracket to allow the present invention 90 to be used with a variety of partitions with smaller thickness.

The slots 20 allow for the installation of the present invention bracket using hole(s) 32 and those in the wall 40 created from a previous installation of a conventional or typical bracket of which hole locations vary for each manufacturer. The holes 22 in the bracket are used to locate additional holes (not shown in FIG. 2) into the partition 30 and provide an additional means of fastening to the partition 30. A slot 24 and a multi-positional locator 26 are used to screw, bolt or otherwise secure the base of the bracket to the wall 40 using hole locations from a previously installed typical bracket of which hole spacing vary for each manufacturer. Slot 24 and multi-positional locator 26 distribute vertical loads approximately evenly to fasteners 56 and 54, respectively, and into the wall.

Figure 3:
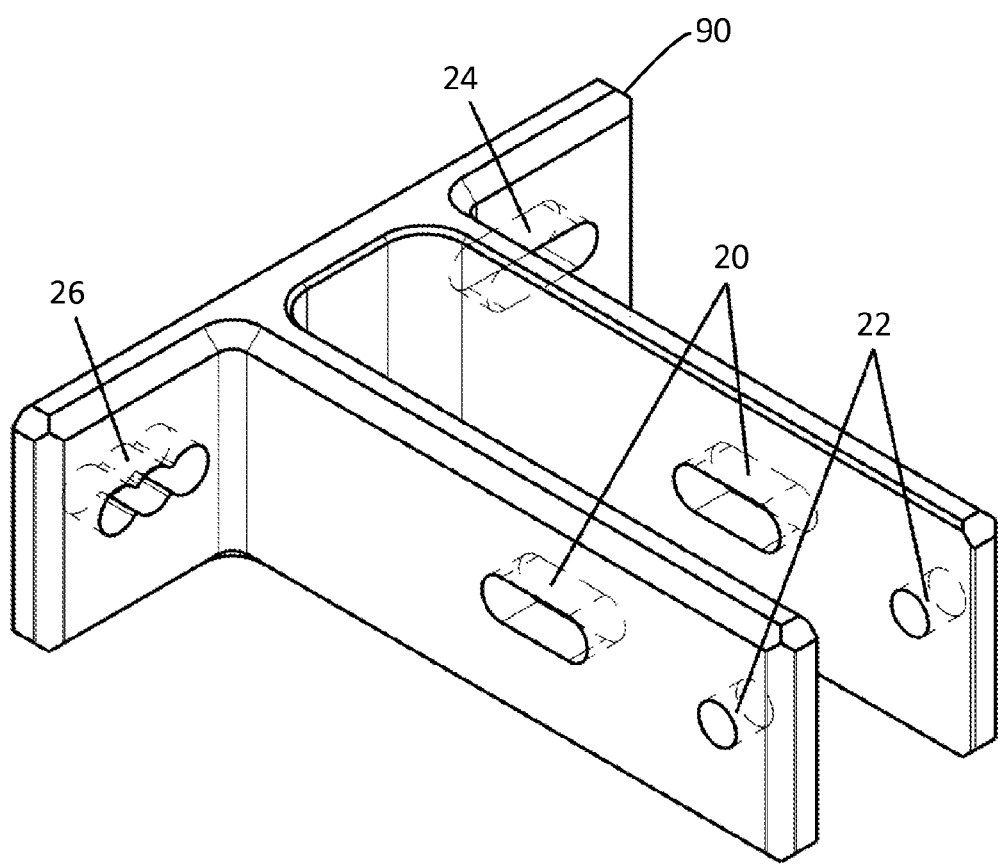
FIG. 3 is a perspective view of the present invention for mounting a privacy partition to the wall of a restroom.
Figure 4:
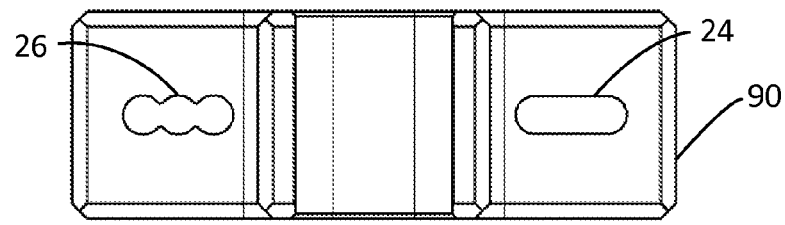
FIG. 4 is an end elevation view of the present invention.
Figure 5:
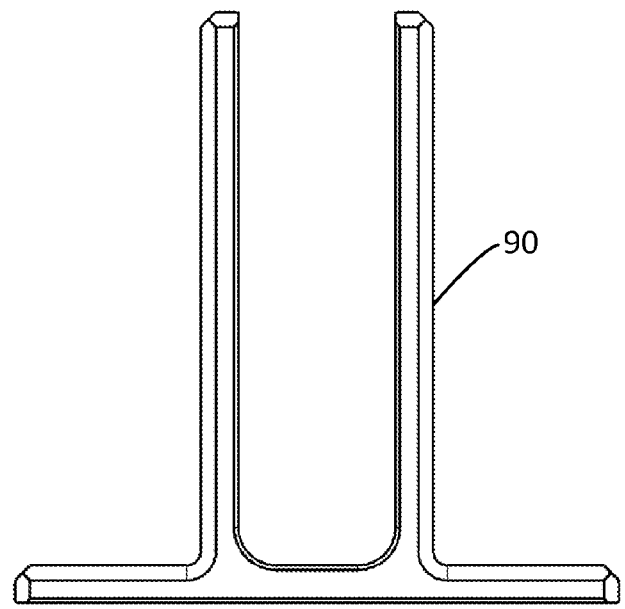
FIG. 5 is a plan view of the present invention.

Referring to FIGS. 3, 4 and 5, the present invention is shown in more detail. The multi-positional locator 26 is created by making several intersecting holes spaced closer together than the diameter of the holes. Since the installed fastener is larger in diameter than the narrowest parts of the multi-positional locator 26, this configuration limits relative motion between the bracket and one of the two wall fasteners, thereby, providing a positive lateral connection to the wall and still allowing compatibly for this bracket to replace a variety of typical brackets, with varying hole spacing, without appreciably relocating the partition.

What is claimed is:
1. A partition mounting bracket, comprising:
   a. a U-shaped profile containing a base and a pair of protruding flanges extending perpendicular and upward from said base;
   b. a set of adjacent slots in said protruding flanges;
   c. a set of adjacent holes in said-protruding flanges;
   d. a pair of additional flanges, extending in the plane of and outward from said base;
   e. a slot in a first of two said additional flanges; and;
   f. a multi-positional locator slot in a second of two said additional flanges, said locator slot created from a plurality of overlapping holes.

* * * * *